United States Patent [19]
Romang et al.

[11] 3,712,051
[45] Jan. 23, 1973

[54] SHOCK ABSORBING PIVOT BEARING FOR WATCHES

[75] Inventors: Lucien Romang; Francois Voumard, les Brenets, Switzerland

[73] Assignee: Seitz S. A., Les Brenets, Switzerland

[22] Filed: March 13, 1972

[21] Appl. No.: 233,989

[30] Foreign Application Priority Data

July 15, 1971 Switzerland..................10528/71

[52] U.S. Cl. ...............................................58/140 A
[51] Int. Cl. .......................G04b 13/02, G04b 31/00
[58] Field of Search...............58/140 R, 140 A, 152 L

[56] References Cited

UNITED STATES PATENTS

| | | | |
|---|---|---|---|
| 2,233,743 | 3/1941 | Marti | 58/140 A |
| 2,700,273 | 1/1955 | Godat | 58/140 A |
| 2,973,618 | 3/1961 | Morf | 58/140 A |
| 3,146,582 | 9/1964 | Loretan | 58/140 A |
| 3,237,394 | 3/1966 | Sholz et al. | 58/140 A |
| 3,306,028 | 2/1967 | Suzuki | 58/140 A |
| 3,500,632 | 3/1970 | Marti | 58/140 A |

Primary Examiner—Richard B. Wilkinson
Assistant Examiner—Stanley A. Wal
Attorney—Richard S. Stevens et al.

[57] ABSTRACT

The return-spring of the resiliently movable bearing cushion is permanently connected to the bearing body member by a hinge joint comprising hinging noses made integral with the spring and being locked in an annular recess of the bearing body member, under an outer rim of the recess inner wall, by a ring force-fitted in the recess outer wall. This ring leaves around the outer rim a slot having a width scarcely greater than the spring thickness and through which the spring hinging noses may be passed upon bending the spring out of its plane.

1 Claim, 3 Drawing Figures

3,712,051

SHOCK ABSORBING PIVOT BEARING FOR WATCHES

BACKGROUND OF THE INVENTION

1. Field of the Invention

This invention relates to the shock absorbing pivot bearings for watches and in particular to bearings of the type comprising movable cushioning means set under the action of a return-spring having a main portion engaging the cushioning means and normally maintaining them resiliently in a predetermined position, and having, moreover, two diametrically opposed projections extending from the main portion radially outwards, one of these projections being removably lockable on the body member of the bearing and the other projection being hinged to the body member for permitting the spring to be rocked from a closed position to an open position while normally retaining the spring permanently connected to the body member of the bearing.

2. Description of the Prior Art

The known bearings of this type have always a drawback either of being composed of pieces delicate and uneasy to be machined, which cannot, moreover, be obtained in a single sequence of automatic operations, or of being assembled in such a manner that the return-spring of the bearing cannot be replaced if it has been damaged upon an awkward handling.

SUMMARY OF THE INVENTION

It is therefore an object of the invention to create a pivot bearing of the type considered above, every piece of which can be easily manufactured in a single sequence of automatic operations either of stamping or of lathe-turning, this bearing being, moreover, assembled in such a manner that its return-spring can be removed and a new one be set in place without having either to disassemble the bearing or even to displace the same with respect to the frame part to which it is secured.

A more particular object of the invention consists in a pivot bearing in which the hinging spring projection passes through an aperture provided across a sleeve portion of the bearing body member surrounding a cushion receiving central recess thereof and extends within an annular recess of the bearing body member provided around the sleeve portion, the latter having its outer surface being undercut to form an outer rim axially retaining the hinging spring projection within the annular recess of the body member, this annular recess being large enough to provide a good access to the outer surface of the sleeve portion for the tool undercutting this sleeve portion, and a locking ring being inserted in the annular recess of the bearing body member normally retaining the hinging spring projection laterally under the outer rim of the sleeve portion of the bearing body member, this locking ring forming, around said outer rim, an annular slot being too narrow to allow the hinging spring projection to pass therethrough inopportunely when the latching spring projection is removed from said outer rim, but being large enough to permit the hinging spring projection passing therethrough when the return-spring is bent out of its plane.

Still further objects of the invention will become apparent in the course of the following description.

BRIEF DESCRIPTION OF THE DRAWINGS

One embodiment of the pivot bearing according to the invention is represented diagrammatically and by way of example in the accompanying drawings.

In the drawings.

DESCRIPTION OF THE PREFERRED EMBODIMENT

Figure 1:
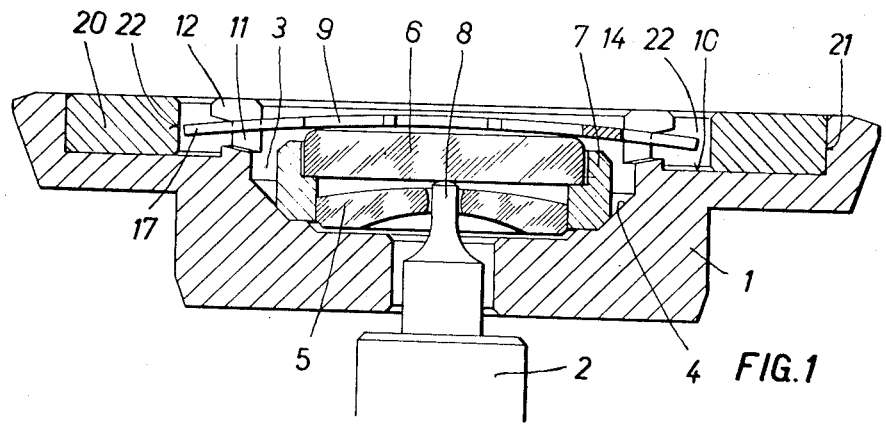
FIG. 1 is a diametrical sectional view of that embodiment.

The body member of the pivot bearing represented in the drawings consists of the top balance-endpiece 1 which is to be fixed to the cock, serves as pivot for the regulating lever of the watch and carries the bearing of the upper pivot of a balance-wheel shaft 2. A central recess 3 having a truncated conical centering surface 4 and being lathe-turned in the upper surface of endpiece 1 receives a movable unit comprising a pierced jewel 5, a cap jewel 6 and a setting 7. The unit (5, 6, 7) serves as cushioning means for the pivot 8 of shaft 2. It normally lies deep in the truncated conical surface 4 under the action of a flat return-spring 9. A wide annular recess is, moreover, lathe-turned in the upper surface of endpiece 1 so as to leave a cylindrical sleeve portion 11 between it and recess 3. Recess 10 is wide enough to provide free access to the outer surface of sleeve portion 11 for a tool undercutting portion 11 and forming an outer rim 12 at the upper end of this portion.

The return-spring 9 comprises a main portion 13 extending within sleeve portion 11 and resiliently bearing on the cap piece 6 so as to hold normally the unit (5, 6, 7) in the position shown in FIG. 1. A hinging projection 14, made integral with the main spring portion 13, extends radially outwards through an aperture 15 provided across sleeve portion 11. Projection 14 is formed at its outer end with a pair of pivoting noses 16 extending transversely away from each other within recess 10 and under rim 12.

The spring main portion 13 is constituted by two resilient legs extending from the hinging projection 14 toward a second aperture 18 provided across sleeve portion 11 and being diametrically opposed to the first aperture 15. At their free ends the two resilient legs forming the main spring portion carry, firstly, actuating parts 17 extending radially outwards through aperture 18, and, secondly, latching noses 19 extending transversely away from one another, each from the outer end of one actuating part 17. Like the pivoting noses 16, the latching noses 19 lie within recess 10, under rim 12.

Figure 2:
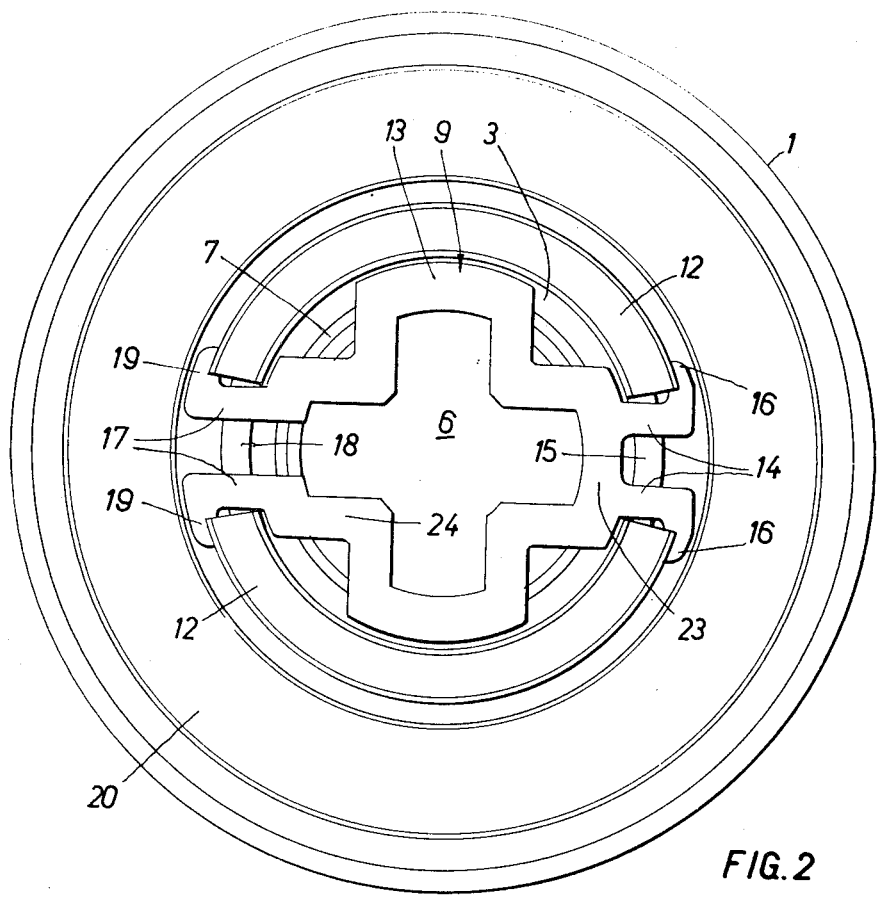
FIG. 2 a plan view thereof.

In FIGS. 1 and 2 the return-spring 9 is in its normal working position. It closes the bearing disclosed while resiliently holding unit (5, 6, 7) within endpiece 1. To remove spring 9 from its closed position, the actuating parts 17 need only be urged toward each other, for inst. by means of tweezers. As a result of that operation, noses 19 are removed from rim 12 and spring 9 may rock about noses 16.

A plain locking ring 20, having at every point of its periphery the same rectangular cross-section and which can thus be cut out of a sheet metal by stamping, is inserted in recess 10 so that it strongly engages the outer wall 21 of this recess 10. Ring 20 prevents noses 16 from inopportunely leaving rim 12. Noses 16 can, however, turn within the portion of recess 10 which ring 20 leaves free thus permitting the spring 9 to rock from the closed position shown into its open position in which it stands almost perpendicular to the upper surface of endpiece 1.

On the occasion of the manufacture of the bearing disclosed, the spring 9 is set in place in the position shown in FIGS. 1 and 2 before ring 20 is force-fitted into wall 21, thus taking advantage of recess 10 being much larger than noses 16 and 19. After having mounted spring 9, ring 20 is set in place thus closing the hinge of spring 9. Ring 20 obviously does not impede the motion of latching noses 19 when spring 9 is to be removed from its closed position or to be restored in that position.

Figure 3:
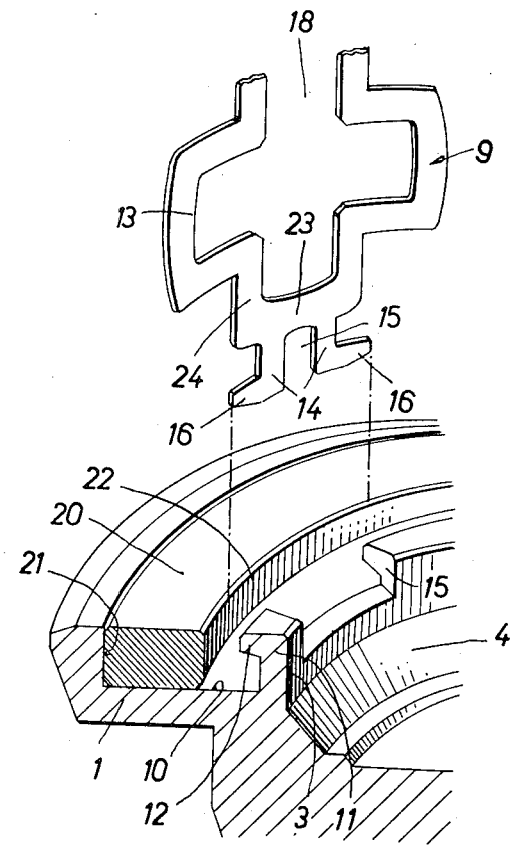
FIG. 3 a partial perspective view, the return-spring being detached from the bearing body member.

Although ring 20 only leaves a narrow slot 22 around rim 12, which has a width scarcely greater than the thickness of spring 9, the latter can nevertheless be removed from the bearing if it has been damaged or even broken upon an awkward handling. Ring 20 not only allows the removal of spring 9, but it also permits a new spring to be set in place. FIG. 3 shows that to introduce noses 16 under rim 12, spring 9 need only be bent out of its plane until it has the same curvature as slot 22. As a matter of fact, this deformation of spring 9 only concerns the bridge portion 23. Since portion 23 is then only subjected to a bending stress, the deformation shown in FIG. 3 produces an elastic strain and cannot, therefore, damage spring 9.

To set a new spring 9 in place in practice, leg 24 of this spring 9 is gripped by means of tweezers. The nose 16 opposed to leg 24 is then introduced into slot 22 and pressed against ring 20. As a result of the last action, portion 23 bends and the second nose 16 may be passed through slot 22 and located under rim 12. Upon releasing leg 24, the spring portion 23 straightens up and noses 16 are confined in recess 10 by rim 12 which they cannot leave inopportunely. Spring 8 is thus permanently connected to body member 1 by a hinge joint so that it cannot be lost when the bearing is opened, for instance for cleaning and/or lubricating the cushioning means thereof.

Various changes of the embodiment described hereabove will appear obvious to those skilled in the art within the scope of the appended claim.

We claim :

1. A shock absorbing pivot bearing for watches, of the type comprising resiliently movable cushioning means, said bearing including a body member, a flat return-spring hinged on said body member so as to be swingable from a closed to an open position and vice versa, said spring acting on the cushioning means for normally maintaining them resiliently in a predetermined position when being in closed position, and a plain locking ring having the same cross-section in every point of its periphery and preventing said return-spring from accidently leaving said body member when said return-spring is in open position, said body member being provided with a central recess for the movable cushioning means and with an annular recess coaxial to said central recess and leaving a substantially cylindrical sleeve portion therearound, said sleeve portion having its outer cylindrical surface being undercut thus forming an outer rim around the sleeve portion, at the upper end thereof, a pair of diametrically opposed apertures being provided across said sleeve portion, said annular recess being wide enough to provide a free access to the cylindrical outer surface, said return-spring having a main portion extending over said central recess of the body member, when said spring is in closed position, and being adapted to engage the cushioning means and to retain the same resiliently within said central recess, a hinging projection extending radially outwardly from said main portion and passing through a first one of said apertures across said sleeve portion, a pair of pivoting noses being located at the outer end of said hinging projection and extending laterally away from each other within said annular recess, under said outer rim of the sleeve projection, said main portion of the return-spring consisting of two resilient legs extending from said hinging projection toward the diametrically opposed second aperture of said sleeve portion, each of said legs being formed at its free end, firstly, with an actuating part extending radially outwards through said second aperture across said sleeve portion and, secondly, with a latching nose extending laterally from the end of said actuating part, within said annular recess, under said outer rim of the sleeve portion, the latching noses being removable from said rim upon urging said actuating parts together while bending said resilient legs, said locking ring being inserted in said annular recess and having its outer surface strongly engaging the outer wall of said annular recess, said locking ring forming, around said outer rim of the sleeve portion, an annular slot being too narrow to allow said pivoting noses to pass therethrough accidently when said latching noses are removed from said outer rim of the sleeve portion, but being large enough to permit said pivoting noses passing therethrough when said return-spring is bent out of its plane, said hinging and said latching noses being substantially narrower than said annular recess.

* * * * *